United States Patent Office 3,475,956
Patented Nov. 4, 1969

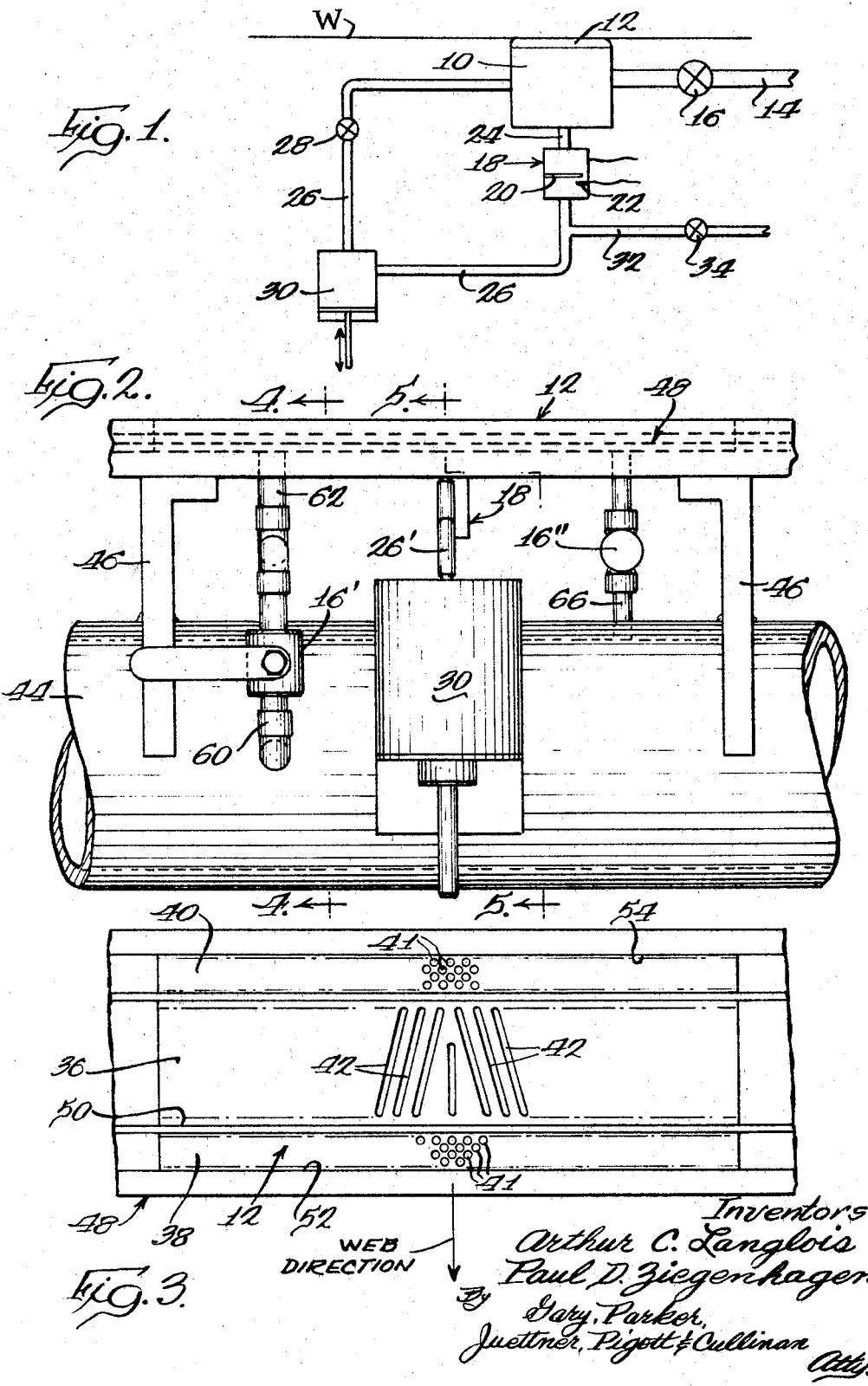

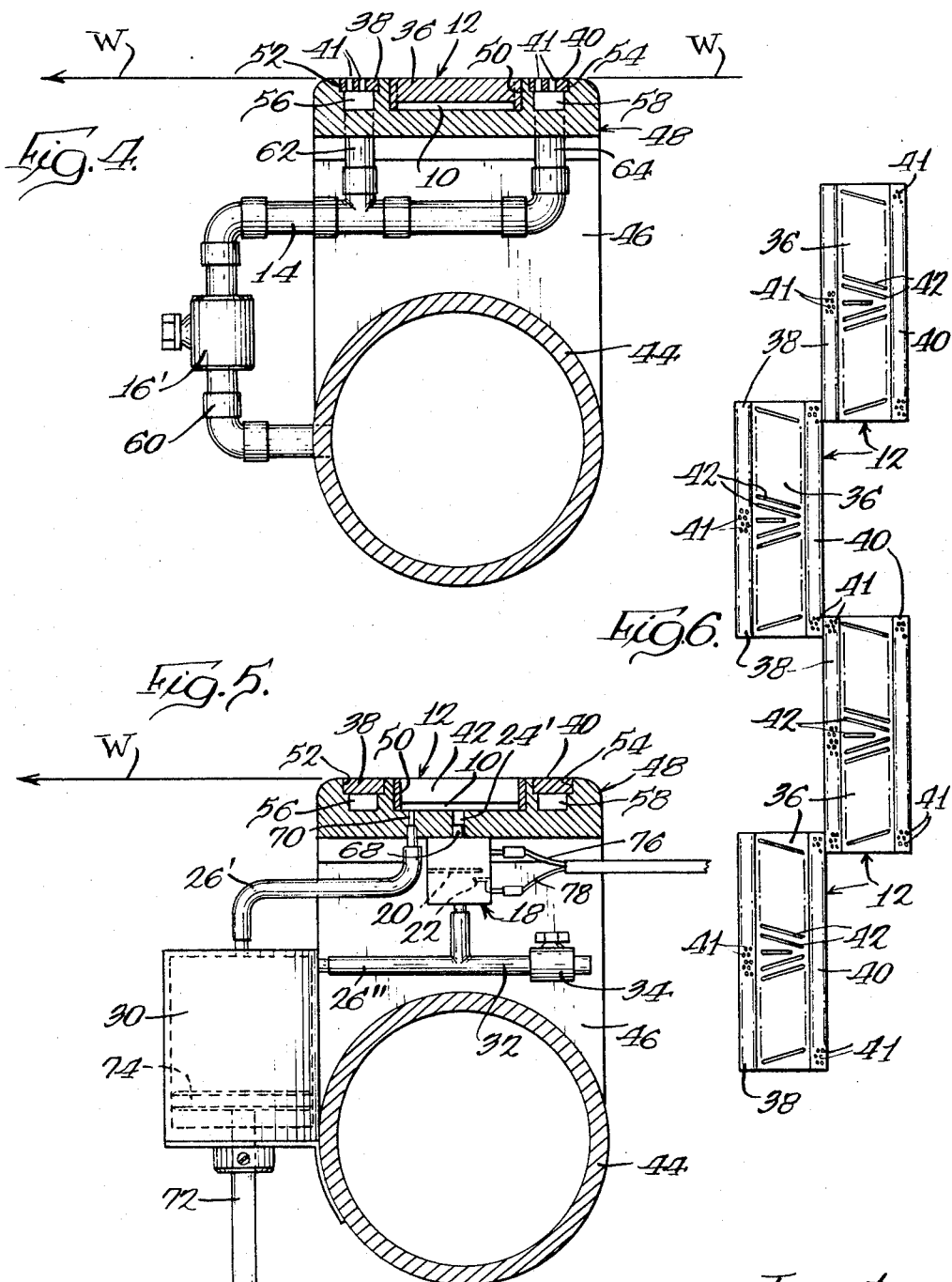

3,475,956
METHOD AND APPARATUS FOR DETECTING
HOLES IN A MOVING WEB
Arthur C. Langlois and Paul D. Ziegenhagen, Wisconsin Rapids, Wis., assignors to Consolidated Papers, Inc., Wisconsin Rapids, Wis.
Filed Dec. 1, 1967, Ser. No. 687,189
Int. Cl. G01l 5/04, 7/08; G01b 13/04
U.S. Cl. 73—159
13 Claims

ABSTRACT OF THE DISCLOSURE

Method and apparatus for detecting holes in a moving web of paper or the like by providing a vacuum chamber which is in communication with one side of the web and by sensing a pressure change in the vacuum chamber as caused by a hole in the sheet passing over such chamber and thus admitting an increased flow of air thereto, including means for adjusting the sensitivity of the apparatus in order to detect only holes of a predetermined minimum size and also means for adjusting the sensitivity of the apparatus with respect to the rate of pressure change per unit of time so as to render the instrument relatively sensitive to pressure changes produced by holes in the web while at the same time relatively insensitive to pressure changes produced by variations in the porosity of the web material.

BRIEF SUMMARY OF THE INVENTION

The presence of small holes in a web of paper are a significant problem in the paper industry because such holes constitute one of the principal causes of web breaks. As one example, where paper is coated on an off-the-machine blade coater, a break in the web as it passes through the coater constitutes a serious problem, and because a large percentage of such web breaks are caused by holes in the web it will be understood that such a problem can be largely alleviated by detecting any holes at the paper machine so that subsequently on a rewinder the holes can be patched or a splice made.

Various devices have been designed in the past for detecting holes in paper. However, such known devices generally are lacking either in the desired sensitivity, or else they are unduly complicated and present serious problems with respect to maintenance. Where attempts have been made to detect holes in a paper web by pneumatic means such as a vacuum chamber and a pressure responsive member, it has been difficult to achieve the desired sensitivity for detection of small holes, and in addition a serious problem has been presented with represented with respect to distinguishing between pressure changes caused by small holes and pressure changes produced by normal variations in the porosity of the web, the latter problem being particularly acute of course where the paper web material is relatively porous.

It is an object of the present invention to provide an improved method and apparatus for detecting holes in a moving web of paper or the like which overcome the foregoing problems and permit increased accuracy and reliability.

A more specific object of the invention is to provide improved hole detection apparatus of a type utilizing a vacuum chamber and pressure differential responsive means, which apparatus can be adjusted to vary its sensitivity to pressure changes thereby permitting selection of an approximate minimum size of hole to be detected.

Another of our objects is to provide hole detection apparatus as last above-mentioned which is capable of adjustment to vary its sensitivity with respect to rate of pressure change per unit of time whereby the apparatus can be rendered relatively insensitive to pressure changes produced by variations in the porosity of the paper web while remaining relatively sensitive to pressure changes produced by holes in the web.

The foregoing and other objects and advantages of the invention will be apparent from the following description thereof.

Now, in order to acquaint those skilled in the art with the manner of making and using our invention, we shall describe, in conjunction with the accompanying drawings, certain preferred embodiments of the invention.

DESCRIPTION OF THE DRAWINGS

FIGURE 1 is a schematic diagram of a hole detecting system constructed in accordance with the present invention;

FIGURE 2 is an elevational view, partly broken away, of specific hole detecting apparatus constructed in accordance with the invention;

FIGURE 3 is a top plan view of the apparatus of FIGURE 2 showing a flat orifice plate member having a sensing section and a pair of seal sections which are positioned so as to be in intimate engagement with a moving web of paper to be tested;

FIGURE 4 is a vertical sectional view taken substantially along the line 4—4 of FIGURE 2;

FIGURE 5 is a vertical sectional view taken substantially along the line 5—5 of FIGURE 2; and FIGURE 6 is a schematic top plan view showing a plurality of units of the type shown in FIGURES 2 and 3 arranged in combination with one another so as to extend across the entire width of a web.

DETAILED DESCRIPTION OF THE INVENTION

Referring now to the drawings, FIGURE 1 is a schematic view showing a vacuum chamber 10 having an orifice plate 12 which is in intimate contact with a moving web of paper W. The chamber 10 is connected to a vacuum source through a conduit 14 having mounted therein a valve 16 which permits adjustment of the vacuum within the chamber 10. In accordance with the invention there is provided a mono-directional pressure differential switch-relay combination 18 of a type manufactured by Fairchild Controls Corporation of Long Island, N.Y. While the invention is not limited to one specific type of pressure actuated switch, it is preferred that it be an ultra-low pressure sensor switch, for example one which is capable of sensing one-tenth inch water pressure changes.

As shown schematically in FIGURE 1, the switch 18 will be closed when the pressure on a positive side thereof exceeds the pressure on a negative side so as to move a diaphragm member 20 downwardly into engagement with a contact 22. The positive side of the pressure differential switch 18 is connected to the vacuum chamber 10 through a relatively short tube or conduit 24, while the vacuum chamber 10 is connected with the opposite or negative side of the pressure differential switch 18 through a tube 26 which is significantly longer than the circuit 24. The tube 26 embodies a micrometer needle valve 28, and also a variable volume sump 30. In addition, the tube 26 can be connected to the atmosphere through an extension 32 which includes an atmospheric leak valve 34.

The operation of the foregoing system will be described in greater detail later herein, but it will here be noted that a suitable vacuum is produced in the chamber 10 through adjustment of the valve 16, and such vacuum is normally applied to both the positive and negative sides of the pressure differential switch 18 through the respective conduits 24 and 26. Accordingly, when the same vacuum pressure is applied to both sides of the switch 18, the diaphragm 20 will remain in a neutral or off position. When a hole is present in the web W, the presence of such hole over the apertured head 12 will permit air to flow through the hole into the vacuum chamber 10 thereby reducing the vacuum therein, i.e., increasing the pressure therein. Thus, in effect, a pressure pulse is produced which will tend to act on the positive side of the switch 18 before it acts on the negative side thereof due to the fact that the conduit 24 is of a lesser length than the conduit 26. If the time required for the switch-relay member 18 to operate is less than the time required for the pressure pulse to reach the negative side of the switch 18 and equalize the pressure on the two sides thereof, then the switch will be closed and the relay actuated.

Reference is now made to FIGURES 2–5 which illustrate a specific preferred embodiment of the invention. There is provided an air head 12 which comprises a central sensing section 36 and a pair of outer sealing sections 38 and 40. In the particular unit shown in FIG. 3, the two sealing sections 38 and 40 are each ½ inch in width and 10 inches in length, and each comprises a nylon grill provided with a plurality of closely spaced holes 41 of a diameter of approximately 5/16 inch. The central sensing section 36 is approximately 1¾ inches in width and 10 inches in length and includes a nylon grill provided with a pluraltiy of diagonal slots 42. The various grills or plates 36, 38 and 40 are substantially coplanar, and the assembly is oriented so that a web of paper W moves across such grills in a direction transverse to the length of the grills and in intimate contact therewith.

As will be explained more fully hereinafter, a vacuum is created beneath the grills 36, 38 and 40, and air is continually drawn through the web and the center grill 36 into the vacuum chamber 10 which is located immediately beneath the sensing section or center grill 36. The volume of air flowing through the slots 42 normally will be relatively small, but when a hole is present in the web W then as the hole passes over the grill 36 it will permit an increase in the flow of air through the slots 42 and will cause an increase in the pressure, i.e., a reduction in the vacuum, within the vacuum chamber 10.

It will be understood that due to the diagonal orientation of the slots 42, with the web W moving in a direction transverse to the length of the grill 36, any hole which is present in the web will be certain to pass over one of the slots and cause an increase in the air flowing therethrough. It will further be understood that the sealing sections 38 and 40 are provided for the purpose of assuring that only air which passes through the web W will flow through the slots 42 in the center grill section 36, while any air which leaks beneath the web W between the latter and the head 12 will be drawn down into one of the sealing grills 38 and 40 and thus prevented from entering the center section 36.

FIGURES 2, 4 and 5 show a large pipe or vacuum header 44 which is connected to a vacuum source (not shown). A plurality of mounting brackets 46 are welded or otherwise secured to the top of the header pipe 44, and an air head body section 48 is fixedly supported at the upper ends of the brackets 46. The body section 48 includes a central longitudinal recess 50 in which the center grill 36 is mounted, and a pair of longitudinal recesses 52 and 54 in which the sealing grills 38 and 40 are mounted. The center grill 36 is disposed in the recess 50 so as to define the vacuum chamber 10 beneath the grill, and sealing chambers 56 and 58 are defined beneath the outer grills 38 and 40. FIGURE 4 shows a pipe 60 which is connected to the vacuum header pipe 44 and which communicates with the two sealing chambers 56 and 58 by means of pipe sections 62 and 64 respectively. A micrometer needle valve 16′ is located in the pipe 60 and can be adjusted to control the vacuum which is applied to the sealing chambers 56 and 58. Referring to FIGURE 2, it will be seen that a further pipe 66 connects the vacuum header 44 to the sensing section 10 of the head 12, and a micrometer needle valve 16″ is located in the pipe section 66 to control the vacuum in the sensing section or chamber 10.

In order to sense an increase in pressure within the sensing section or vacuum chamber 10, the combination differential pressure switch and relay 18 is mounted immediately beneath the air head body section 48 as shown in FIGURES 2 and 5. A hole 24′ is formed in the base of the body section 48, and a short tubular extension 68 which forms a part of the switch and relay assembly 18 is threaded into the hole 24′, whereby the differential pressure switch 18 is in communication with the sensing section or vacuum chamber 10. In addition, a second hole 70 is formed in the base of the body section 48 so as to communicate with the sensing section 10, and a conduit 26′ has one end thereof connected to the sensing section 10 at the hole 70. The other end of the conduit 26′ is connected to the variable volume sump 30, and the sump is then connected to the differential pressure switch 18 by means of a second conduit 26″.

The conduit 26″ includes a section 32 which leads to the atmosphere and which contains an atmospheric leak valve 34. The sump 30 contains an adjustable piston rod 72 and a piston 74, and it will be understood that the position of the piston 74 may be adjusted in order to adjust the effective volume of the sump between the conduits 26′ and 26″. The combination switch and relay 18 includes a pair of electrical leads 76 and 78 which are connected to any desired type of signal member (not shown) which is to be actuated to indicate the presence of a hole in the web W. For example, the leads 76 and 78 may be connected to a readout box having a plurality of indicator lights which will light up to indicate the presence and location of a hole.

The operation of the method and apparatus of the present invention will now be described. The apparatus is positioned so that the head 12 is disposed in intimate contact with a moving web of paper W, the head being oriented so that the web W moves transverse to the length of the head as shown in FIGURE 3. In the embodiment being described, the head 12 shown in FIGURES 2–5 is 10 inches in length. Thus in order to cover the entire width of a web W, it will normally be necessary to provide a plurality of the units shown. For example, if the web W is 180 inches in width, then eighteen of the units being described may be mounted in end-to-end relation so as to extend the full width of the web W. However, FIGURE 6 shows a preferred arrangement where a plurality of the units are arranged in the same horizontal plane in staggered relation so as to slightly overlap one another so as to provide in effect two transverse rows of the hole detection units with the units in each row spaced apart slightly less than the length of a single unit to afford some overlapping with the units in the adjacent row.

The web W moves over the head 12 and is maintained in intimate contact with the center grill 36 and the outer grills 38 and 40 due to the vacuum which is produced with the center chamber 10 and the outer chambers 56 and 58. The vacuum level in the outer sealing chambers 56 and 58 is initially regulated by adjustment of the valve 16′, and the vacuum level in the sensing section 10 is initially regulated by adjustment of the valve 16″. Under equilibrium conditions, as long as there is no hole in the portion of the web W which is passing over the detection head 12, the pressure will be equalized on the two sides of the differential pressure switch 18, and the switch will be in its off position. In other words, the upper side of the switch 18 will be exposed to the vacuum level in the sensing chamber 10 due to the relatively short conduit 24′, 68 therebetween. In addition, the lower side of the switch 18 will be exposed to the vacuum level in the chamber 10 through the relatively long conduits 26′ and 26″ and the sump member 30 which is made apart of the latter conduits.

Accordingly, both sides of the switch 18 are in communication with the chamber 10, and under equilibrium conditions both sides of the switch will be subjected to the same vacuum level so that the diaphragm 20 will remain in a neutral or off position. When a hole in the web W crosses over the center grill 36, air will flow through the hole into the sensing section 10 thereby reducing the vacuum level therein, i.e., increasing the pressure therein. Such a pressure increase or pressure pulse will first act upon the upper side of the differential pressure switch 18 because of the short length of the conduit 24', 68, and after a certain time delay the same pressure pulse will pass through the conduit 26', the sump 30, and the conduit 26" so as to act on the lower side of the switch and again equalize the pressure at the two sides of the switch.

It will be understood that if the first pressure pulse acting on the top side of the switch 18 has actuated the latter, then when the equalizing pulse acts upon the lower side of the switch it will return the switch to a neutral or off position so as to prepare the apparatus for sensing the next hole. On the other hand, it will further be understood that if the time required for the switch and relay combination 18 to operate exceeds the time delay necessary to achieve equalization of pressure at the two sides of the switch, then the switch and relay 18 will not be actuated, regardless of the magnitude of the pressure pulse.

The foregoing time delay feature comprises an important aspect of the present invention. The time delay required for equalization can be adjusted by adjusting the position of the piston 74 so as to vary the volume of the sump 30. That is, by increasing the volume of the sump 30, it is possible to increase the time delay required to equalize the pressure at the two sides of the switch 18. Conversely, by moving the piston 74 to reduce the volume of the sump 30, the time delay required for equalization is diminished. Regarding the latter, it will be understood that if it were possible to reduce the total volume and length of the conduits 26' and 26" and volume of the sump 30 so that it equaled the length and volume of the conduit 24' which leads to the upper side of the switch 18, then the switch would never operate. This is because the presence of a hole in the web W passing over the head 12 would simply produce simultaneous equal pressure pulses at the two sides of the switch, in which case the two pulses would offset one another and the switch would not operate.

An important advantage of the foregoing apparatus is that it permits adjustment of the time delay in order to adjust the sensitivity of the apparatus with respect to the rate of change of pressure in the chamber 10. In other words, when the volume of the sump 30 is enlarged, the time required for equalization of the pressure at the two sides of the switch 18 is increased, with the result that the sensitivity of the device is increased. Under such circumstances, the device is relatively sensitive to pressure increases including those where the value of $dP/dT$ is relatively small, it being understood that $dP/dT$ represents the rate of change of pressure for a given unit of time. On the other hand, by decreasing the size of the sump 30, the time required for equalization of the pressure at the two sides of the switch 18 is reduced, with the result that the apparatus becomes less sensitive to pressure changes where the value of $dP/dT$ is relatively small.

Relative to the foregoing discussion of the factor $dP/dT$, i.e., the rate of pressure change, it has been found that by adjusting the sensitivity of the apparatus with respect to $dP/dT$ it is possible to distinguish between pressure changes caused by holes in the web and pressure changes caused by variations in the porosity of the web. One of the most significant problems encountered in the use of pneumatic hole detection means for detecting holes in paper or the like relates to the difficulty in providing an instrument which is capable of sensing relatively small holes and at the same time is capable of distinguishing the effect of a hole from the effect produced by a porosity change in the web.

When a non-porous paper is being tested the problem is not significant because very little air will be drawn through the paper by the vacuum in the chamber 10 until such time that a hole in the web passes over the head 12, and when the latter occurs the resultant increase in air flow and consequent pressure pulse in the chamber 10 is relatively simple to detect. On the other hand, where the paper being tested is relatively porous, it becomes more difficult to detect the presence of a small hole in the web without causing the instrument to be sensitive to pressure changes caused only by porosity variations in the web and not be the presence of a hole therein.

In accordance with the present invention, the volume of the sump 30 is adjusted relative to the porosity of the paper being tested. In other words, when the paper is relatively non-porous, the volume of the sump 30 may be enlarged so as to render the instrument highly sensitive to pressure changes, even where the value of $dP/dT$ is relatively small. However, where the web W is relatively porous, the volume of the sump 30 is decreased, with the result that the apparatus will be less sensitive to pressure changes where $dP/dT$ is small. It has been found that the value of $dP/dT$ will be smaller for changes in pressure in the chamber 10 caused by variations in porosity of the web W than it will be for changes in pressure produced by a hole in the web. That is, a hole tends to produce a sharper or more sudden pressure change. Accordingly, where the paper web W is porous and variations in porosity thereof tend to falsely indicate the presence of holes, it is possible to reduce the above-described time delay required for equalization of the pressure at the two sides of the switch 18 by reducing the size of the sump 30 and in this manner render the instrument less sensitive to porosity changes while remaining relatively sensitive to changes in pressure produced by holes in the web where the value of $dP/dT$ tends to be higher.

In contrast with the foregoing ability to adjust the sensitivity of the apparatus with respect to the rate of pressure change or value of $dP/dT$, it is also possible in accordance with the present invention to adjust the sensitivity of the apparatus with respect to the magnitude of the pressure pulse which is produced in the vacuum chamber 10. The latter adjustment can be achieved by adjusting the atmospheric leak valve 34 shown in FIGURES 1 and 5. Thus, in many applications it may be found that where holes in the web measure less than a certain diameter, e.g., ¼ inch diameter, they do not present a serious problem. In such situations, the operator may want to adjust the apparatus so that it will not detect any holes which do not measure at least approximately ¼ inch diameter. With the apparatus of the present invention such hole size selection can be accomplished by simply opening the atmospheric leak valve 34 a predetermined amount.

When the valve 34 is opened it admits a certain amount of air from the atmosphere with the result that the vacuum acting on the bottom side of the differential pressure switch 18 is less than the vacuum acting on the top side of the switch. Consequently, the diaphragm 20 is initially biased toward its off position, and in order to actuate the switch a pressure pulse will be required at the top side of the switch which exceeds the magnitude of the bias. In other words, the more the atmospheric leak valve 34 is opened, the greater the switch diaphragm 20 will be preloaded toward its off position, and thus the greater the pressure pulse required to actuate the switch. It will of course be understood that the magnitude of the change of pressure within the vacuum chamber 10, i.e., the magnitude of the pressure pulse created therein, is generally proportional to the area of the hole in the web which produces the pressure pulse. Therefore, as the valve 34 is opened, the apparatus becomes less sensitive to holes of a smaller diameter.

FIGURE 1 shows a further valve 28 mounted in the line 26 which leads from the vacuum chamber 10 to the sump 30. Such a valve is not shown in the embodiment of FIGURES 2–5, although it may if desired be provided either in the conduit 26' or in the conduit 26". Adjustment of the valve 28 is somewhat comparable to adjustment of the sump 30, to the extent that closing down the valve 28 tends to delay equalization of the pressure at the differential pressure switch 18, as does movement of the piston 74 to enlarge the sump 30, and conversely, opening up of the valve 28 tends to decrease the time delay required for equalization of the pressure at the switch 18 as does a reduction of the volume of the sump 30. It will be understood that varying the volume of the sump 30 is generally equivalent to varying the length of the conduit 26 shown in FIGURE 1. The valve 28 affords a somewhat similar adjustment, although it has been found that the variable volume sump provides a more effective means of controlling the sensitivity of the apparatus to the rate of pressure change $dP/dT$.

While no specific signal means has been described herein, it will be understood that the combination pressure differential switch and relay 18 may be connected to a signal light or horn or the like to indicate the presence of a hole in the web W, and may also be connected to an automatic marking system for marking the location of a hole. As previously indicated, the hole detection apparatus will normally extend the full width of the web, i.e., the width of a paper making machine, and a preferred arrangement for staggering the units to provide a slight overlap therebetween is shown in FIGURE 6. Moreover, each of the several sensing sections 36 would be provided with its own corresponding differential pressure switch and relay combination 18 which in turn would be connected with a corresponding signal member, for example, an indicator light. It is possible to provide a readout box having a plurality of indicator lights, one associated with each of the sensing sections 36. Accordingly, by noting which of the several indicator lights has been actuated, it is possible to determine the approximate location of each hole in the web W.

The hole detection apparatus of the present invention is simpler in its design and requires less maintenance than the apparatus heretofore known, and in addition it is capable of operating at unusually high speeds. Tests have shown that such apparatus can readily detect ⅛ inch diameter holes in a web of paper moving at a speed of 5000 feet per minute. The apparatus described herein is also quite compact and measures no more than six inches in the machine direction and six inches in depth, it being understood that the length will normally equal the width of the web W. The apparatus operates well on a relatively small amount of vacuum, and preferably a vacuum of only 3 to 6 inches of water need be produced depending upon the density or porosity of the web W.

Moreover, as explained hereinabove, the apparatus of the present invention is capable of independent adjustment both with respect to its sensitivity to the magnitude of a pressure change and also with respect to its sensitivity to the rate of pressure change or $dP/dT$. In the latter instance, the sensitivity of the instrument is adjusted by varying the time delay necessary to produce an equalizing pressure pulse at the bottom side of the switch 18. Thus, it will be understood that in order for the switch and relay 18 to be actuated two conditions must be met, namely, a pulse of a certain minimum magnitude must be produced at the upper side of the switch, and, second, such pulse must actuate the switch and relay 18 in a time less than that required for an equalizing pulse to reach the opposite or lower side of the switch.

While we have described our invention in certain preferred forms, we do not intend to be limited to such forms, except insofar as the appended claims are so limited, since modifications coming within the scope of our invention will readily occur to those skilled in the art, particularly with our disclosure before them.

We claim:

1. Apparatus for detecting holes in a moving web of paper or the like comprising, in combination, air head means including grill means positioned for intimate contact with a moving web and a vacuum chamber located behind said grill means, a vacuum source connected to said vacuum chamber to produce a predetermined vacuum level therein, differential pressure responsive means, first connecting means between said vacuum chamber and one side of said differential pressure responsive means, and second connecting means between said vacuum chamber and an opposite side of said differential pressure responsive means, said second connecting means having a greater volume than said first connecting means, whereby the presence of a hole in the web moving over said grill means will produce a pressure increase in said vacuum chamber and said pressure increase will act on one side of said differential pressure responsive means before acting on the opposite side thereof so as to effect actuation of said differential pressure responsive means thereby indicating the presence of a hole in said web.

2. The invention of claim 1 where said differential pressure responsive means comprises a pressure differential switch which is connected to signal means for actuating the latter to indicate the presence of a hole in said web.

3. The invention of claim 1 where said second connecting means is substantially longer than said first connecting means to provide a desired time delay between the time a pressure increase in said vacuum chamber acts upon one side of said differential pressure responsive means and the time it acts on the opposite side thereof.

4. The invention of claim 1 where on of said connecting means includes volume adjusting means for adjusting the volume of said connecting means thereby permitting adjustment of the time delay between the time a pressure increase in said vacuum chamber acts upon one side of said differential pressure responsive means and the time it acts on the opposite side thereof.

5. The invention of claim 4 where said volume adjusting means comprises a variable volume sump.

6. The invention of claim 1 where said grill means is formed with a plurality of diagonal slots therein which are inclined from the direction of movement of said web by an angle of less than 45 degrees.

7. The invention of claim 6 where said diagonal slots are inclined from the direction of movement of said web by an angle in the approximate range of 10 to 20 degrees.

8. The invention of claim 1 where sealing chambers are provided along the length of said vacuum chamber, there being one sealing chamber on each side of said vacuum chamber, grill means mounted over each of said sealing chambers in coplanar in relation with the grill means on said vacuum chamber, and means for connecting each of said sealing chambers to a vacuum source.

9. The invention of claim 1 where a plurality of apparatuses for detecting holes as defined in claim 1 are arranged in combination so as to extend across the width of a moving web, said apparatuses being arranged in two rows with the air head means in one row being staggered relative to the air head means in the other row and with the air head means in each row being spaced from one another a distance somewhat less than the length of a single air head means so as to afford a predetermined amount of overlapping between adjacent air head means.

10. Apparatus for detecting holes in a moving web of paper or the like comprising, in combination, air head means including grill means positoned for intimate contact with a moving web and a vacuum chamber located behind said grill means, a vacuum source connected to said vacuum chamber to produce a predetermined vacuum level therein, a pressure differential switch positioned in proximity to said vacuum chamber and utilized to actuate signal means for indicating the presence of a hole in said web, first relatively short connecting means between said vacuum chamber and one side of said switch so as to permit a pressure increase in said chamber to act upon said switch and actuate the same, second relatively long connecting means between said vacuum chamber and an opposite side of said switch to permit a pressure increase in said chamber to act also upon said opposite side of said switch so as to substantially equalize the pressure on the two sides of said switch after a predetermined time delay whereby the presence of a hole in the web moving over said grill means will produce a pressure increase in said vacuum chamber and said pressure increase will act first on one side of said pressure differential switch and thereafter will act on the opposite side of said switch, and volume adjusting means for adjusting the volume of at least one of said connecting means thereby permitting adjustment of the time delay between the time a pressure increase in said vacuum chamber acts upon one side of said pressure differential switch and the time it acts on the opposite side thereof.

11. The invention of claim 10 where said volume adjusting means comprises a variable volume sump.

12. The invention of claim 10 including adjustable atmospheric leak means for admitting a predetermined amount of air from the atmosphere to act upon said opposite side of said switch thereby in effect pre-loading said switch toward its off position, said atmospheric leak means serving to control the sensitivity of said apparatus to holes of a predetermined minimum size.

13. A method of detecting holes in a moving web of paper or the like comprising the steps of applying a vacuum to a vacuum chamber immediately adjacent the moving web so as to draw air through said web and into said vacuum chamber, sensing at a first location an increase in pressure in said vacuum chamber caused by a hole in the web passing over said vacuum chamber, sensing said same pressure increase at a second location further removed from said vacuum chamber, said pressure increase being sensed at said second location a predetermined time after the sensing of said pressure increase as said first location, utilizing said pressure increase at said first location to operate signal means to indicate the presence of a hole in said web, utilizing said pressure increase at said second location to in effect offset said pressure increase at said first location, and adjusting said time delay to control the actuation of said signal means in accordance with the rate of pressure change $dP/dT$.

References Cited
UNITED STATES PATENTS

| | | | |
|---|---|---|---|
| 1,604,138 | 10/1926 | Vidaver | 73—159 |
| 2,694,911 | 11/1954 | Peck. | |
| 3,111,026 | 11/1963 | Powell | 74—37.7 XR |
| 3,115,037 | 12/1963 | Forrester | 73—159 |
| 3,201,985 | 8/1965 | Williams | 73—37.7 XR |
| 3,348,313 | 10/1967 | Urmenyi | 33—148 |
| 3,352,157 | 11/1967 | Seegmiller | 73—406 XR |

LOUIS R. PRINCE, Primary Examiner

J. NOLTON, Assistant Examiner

U.S. Cl. X.R.

73—37.7, 406